United States Patent
Chen et al.

(10) Patent No.: US 10,727,660 B1
(45) Date of Patent: Jul. 28, 2020

(54) CABLE ASSEMBLY AND CABLE INDICATION SYSTEM

(71) Applicant: BKS TEC CORP., Zhubei, Hsinchu County (TW)

(72) Inventors: Cheng Hsiang Chen, Zhubei (TW); Tsung Hsien Huang, Zhubei (TW)

(73) Assignee: BKS TEC CORP., Zhubei, Hsinchu County (TW)

( * ) Notice: Subject to any disclaimer, the term of this patent is extended or adjusted under 35 U.S.C. 154(b) by 0 days.

(21) Appl. No.: 16/591,996

(22) Filed: Oct. 3, 2019

(51) Int. Cl.
| | | |
|---|---|---|
| H01R 24/20 | (2011.01) | |
| H02G 15/08 | (2006.01) | |
| H01B 9/02 | (2006.01) | |
| G02B 6/42 | (2006.01) | |
| H01B 9/00 | (2006.01) | |
| H01R 107/00 | (2006.01) | |

(52) U.S. Cl.
CPC .......... *H02G 15/08* (2013.01); *G02B 6/4202* (2013.01); *G02B 6/428* (2013.01); *G02B 6/4219* (2013.01); *H01B 9/003* (2013.01); *H01B 9/02* (2013.01); *H01R 24/20* (2013.01); *H01R 2107/00* (2013.01); *H02G 2200/20* (2013.01)

(58) Field of Classification Search
CPC .... H02G 15/08; H02G 2200/20; H01R 24/20; H01R 2107/00; G02B 6/4202; G02B 6/4219; G02B 6/428; H01B 9/02; H01B 9/003
See application file for complete search history.

(56) References Cited

U.S. PATENT DOCUMENTS

| | | | | |
|---|---|---|---|---|
| 2010/0319956 | A1* | 12/2010 | Ballard ............... | B60R 16/0207 174/105 R |
| 2013/0178093 | A1* | 7/2013 | Altice ................ | G05B 19/0428 439/488 |
| 2013/0210272 | A1* | 8/2013 | Yuan .................... | H01R 9/0515 439/581 |
| 2014/0099061 | A1* | 4/2014 | Isenhour .............. | G02B 6/3887 385/79 |
| 2014/0106617 | A1* | 4/2014 | Csak .................... | H01R 13/504 439/606 |
| 2014/0241674 | A1* | 8/2014 | Isenhour .............. | G02B 6/4284 385/93 |
| 2015/0295338 | A1* | 10/2015 | Drake .................. | H01R 13/443 439/148 |
| 2015/0378122 | A1* | 12/2015 | Simmons ............... | H01R 27/02 439/529 |
| 2016/0006165 | A1* | 1/2016 | Becker ............... | H01R 13/5221 439/271 |
| 2016/0370547 | A1* | 12/2016 | Logan, Jr. ........... | G02B 6/4293 |
| 2018/0366890 | A1* | 12/2018 | Lloyd .................. | H01R 31/005 |
| 2020/0044947 | A1* | 2/2020 | Aldridge ............. | H04L 43/0876 |

* cited by examiner

*Primary Examiner* — Truc T Nguyen
(74) *Attorney, Agent, or Firm* — Muncy, Geissler, Olds & Lowe, P.C.

(57) ABSTRACT

The present disclosure provides a cable assembly and a cable indication system. The cable assembly includes a cable, a first connector, and a second connector. The cable includes a jacket defining a first cavity and a second cavity, the first cavity includes at least one electrical wire extending through the first cavity, and the second cavity includes a light bar extending through the second cavity. The first connector is electrically coupled to a first end of the cable, and includes a first interface for connecting with a first device. The second connector is electrically coupled to a second end of the cable, and includes a second interface for connecting with a second device.

19 Claims, 8 Drawing Sheets

CABLE ASSEMBLY AND CABLE INDICATION SYSTEM

TECHNICAL FIELD

The present disclosure relates to a cable, and in particular, to a cable assembly and a cable indication system with controllable settings.

DISCUSSION OF THE BACKGROUND

Cable assemblies with fiber optic wires are used in various environments for power and data transmission between different devices. These environments are often cluttered by large quantities of the cable assemblies. Moreover, the operator often needs to quickly identify different devices among the cluttered arrangement of the cables. The cluttered arrangement of cables often leads to decreased efficiency and aesthetics of the environment. Therefore, minimizing the clutter of the cable assemblies with intuitive and controllable identification is crucial in these environments.

This Discussion of the Background section is provided for background information only. The statements in this Discussion of the Background are not an admission that the subject matter disclosed in this section constitutes prior art to the present disclosure, and no part of this Discussion of the Background section may be used as an admission that any part of this application, including this Discussion of the Background section, constitutes prior art to the present disclosure.

SUMMARY

One aspect of the present disclosure provides a cable assembly, including a cable, a first connector, and a second connector. The cable includes a jacket defining a first cavity and a second cavity, the first cavity includes at least one electrical wire extending through the first cavity, and the second cavity includes a light bar extending through the second cavity. The first connector is electrically coupled to a first end of the cable, and the first connector includes a first interface for connecting with a first device. The second connector is electrically coupled to a second end of the cable, and the second connector includes a second interface for connecting with a second device.

In some embodiments, the light bar comprises at least one optical-fiber cable having a core portion surrounded by a cladding portion in the second cavity.

In some embodiments, the at least one electrical wire is a copper wire for power and signal transmission between the first device and the second device.

In some embodiments, the cable assembly further includes a control unit configured to adjust a light setting of the light bar in the second cavity.

In some embodiments, the control unit includes a press control subunit for adjusting the light setting according to a press command, a wireless control subunit for adjusting the light setting according to a wireless signal, a mobile device control subunit for adjusting the light setting according to a mobile device command, and a personal computer control subunit for adjusting the light setting according to a personal computer command.

In some embodiments, the control unit further includes an auxiliary function subunit for controlling an auxiliary function of the cable assembly.

In some embodiments, the cable assembly further includes at least one circuit board, wherein the control unit is disposed in the circuit board, and the circuit board further includes at least one first light-emitting diode (LED) for emitting a first visible light to the light bar.

In some embodiments, the circuit board further includes at least one second LED for emitting a second visible light to the light bar.

In some embodiments, the first LED and the second LED are red, green and blue (RGB) LEDs.

In some embodiments, the control unit controls the first LED and the second LED according to the light setting, and the first LED and the second LED are flashed at a predetermined interval, turned on or off for a set period of time, or turned constantly on.

Another aspect of the present disclosure provides a cable indication system, including a cable assembly and a setting controller. The cable assembly includes a cable, a first connector, a second connector, and a control unit. The cable includes a jacket defining a first cavity and a second cavity, the first cavity includes at least one electrical wire extending through the first cavity, and the second cavity includes a light bar extending through the second cavity. The first connector is electrically coupled to a first end of the cable, and the first connector includes a first interface for connecting with a first device. The second connector is electrically coupled to a second end of the cable, and the second connector includes a second interface for connecting with a second device. The control unit is configured to adjust a light setting of the light bar in the second cavity. The setting controller transmits a command to adjust the light setting of the light bar.

In some embodiments, the light bar includes at least one optical-fiber cable having a core portion surrounded by a cladding portion in the second cavity.

In some embodiments, the at least one electrical wire is a copper wire for power and signal transmission between the first device and the second device.

In some embodiments, the control unit includes a press control subunit for adjusting the light setting according to a press command, a wireless control subunit for adjusting the light setting according to a wireless signal, a handset control subunit for adjusting the light setting according to a handset command, and a personal computer control subunit for adjusting the light setting according to a personal computer command.

In some embodiments, the control unit further includes an auxiliary function subunit for controlling an auxiliary function of the cable assembly.

In some embodiments, the cable assembly of the cable indication system further includes at least one circuit board, wherein the control unit is disposed in the circuit board, and the circuit board further includes at least one first LED for emitting a first visible light to the light bar.

In some embodiments, the circuit board further includes at least one second LED for emitting a second visible light to the light bar.

In some embodiments, the first LED and the second LED are RGB LEDs.

In some embodiments, the control unit controls the first LED and the second LED according to the light setting, wherein the first LED and the second LED are flashed at a predetermined interval, turned on or off for a set period of time, or turned constantly on.

In some embodiments, the first device is a power and data source, and the second device is an external device receiving power and data from the first device.

In the present disclosure, the cable assembly and the cable indication system enable a user to adjust the light setting remotely, such as by an application on a mobile phone, or the user can adjust the light setting by hand. Since the user is able to change the color of light for different cables, the user can visually differentiate between different cables and their connected devices, thereby increasing convenience and the aesthetics of the cables.

The foregoing has outlined rather broadly the features and technical advantages of the present disclosure in order that the detailed description of the disclosure that follows may be better understood. Additional features and advantages of the disclosure will be described hereinafter, and form the subject of the claims of the disclosure. It should be appreciated by those skilled in the art that the conception and specific embodiment disclosed may be readily utilized as a basis for modifying or designing other structures or processes for carrying out the same purposes of the present disclosure. It should also be realized by those skilled in the art that such equivalent constructions do not depart from the spirit and scope of the disclosure as set forth in the appended claims.

BRIEF DESCRIPTION OF THE DRAWINGS

A more complete understanding of the present disclosure may be derived by referring to the detailed description and claims when considered in connection with the Figures, where like reference numbers refer to similar elements throughout the Figures, and:

DETAILED DESCRIPTION

Embodiments, or examples, of the disclosure illustrated in the drawings are now described using specific language. It shall be understood that no limitation of the scope of the disclosure is hereby intended. Any alteration or modification of the described embodiments, and any further applications of principles described in this document, are to be considered as normally occurring to one of ordinary skill in the art to which the disclosure relates. Reference numerals may be repeated throughout the embodiments, but this does not necessarily mean that feature(s) of one embodiment apply to another embodiment, even if they share the same reference numeral.

It shall be understood that, although the terms first, second, third, etc. may be used herein to describe various elements, components, regions, layers or sections, these elements, components, regions, layers or sections are not limited by these terms. Rather, these terms are merely used to distinguish one element, component, region, layer or section from another element, component, region, layer or section. Thus, a first element, component, region, layer or section discussed below could be termed a second element, component, region, layer or section without departing from the teachings of the present inventive concept.

The terminology used herein is for the purpose of describing particular example embodiments only and is not intended to be limited to the present inventive concept. As used herein, the singular forms "a," "an" and "the" are intended to include the plural forms as well, unless the context clearly indicates otherwise. It shall be further understood that the terms "comprises" and "comprising," when used in this specification, point out the presence of stated features, integers, steps, operations, elements, or components, but do not preclude the presence or addition of one or more other features, integers, steps, operations, elements, components, or groups thereof.

Figure 1:
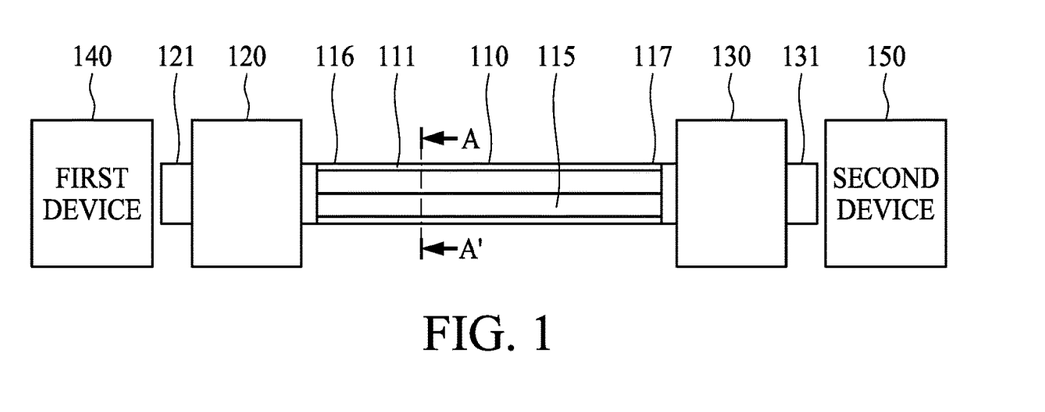
FIG. 1 is a top view of a cable assembly according to some embodiments of the present disclosure.
Figure 2:
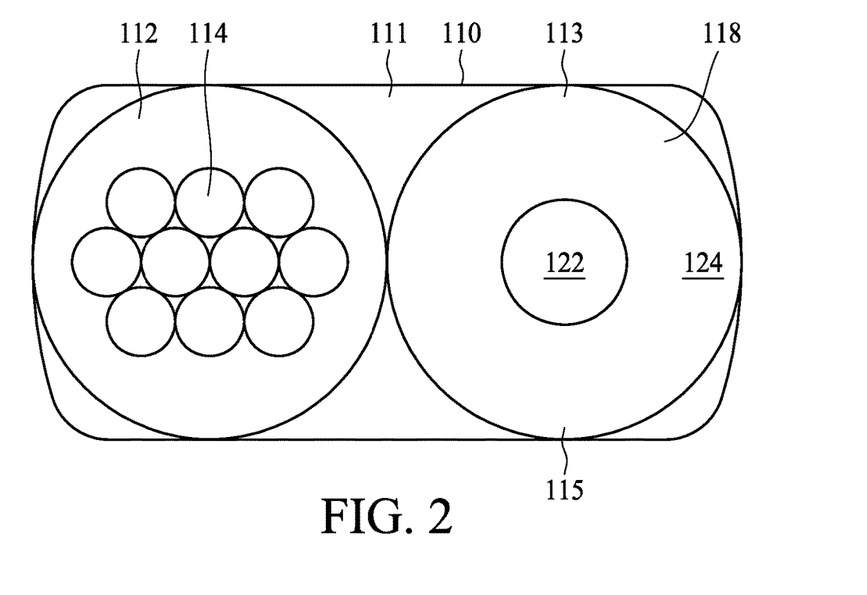
FIG. 2 is a cross-sectional view of a cable in a cable assembly along a line A-A' in FIG. 1 according to some embodiments of the present disclosure.

FIG. 1 is a top view of a cable assembly 100 according to some embodiments of the present disclosure. FIG. 2 is a cross-sectional view of a cable 110 in the cable assembly 100 along a line A-A' in FIG. 1 according to some embodiments of the present disclosure. With reference to FIG. 1 and FIG. 2, in some embodiments, the cable assembly 100 includes a cable 110, a first connector 120, and a second connector 130. As shown in FIG. 2, the cable 110 includes a jacket 111 defining a first cavity 112 and a second cavity 113. The first cavity 112 includes at least one electrical wire 114 extending through the first cavity 112. The second cavity 113 includes a light bar 115 extending 10o through the second cavity 113. The first connector 120 is electrically coupled to a first end 116 of the cable 110, and the first connector 120 includes a first interface 121 for connecting with a first device 140. The second connector 130 is electrically coupled to a second end 117 of the cable 110, and the second connector 130 includes a second interface 131 for connecting with a second device 150. In some embodiments, the light bar 115 includes at least one optical-fiber cable 118 having a core portion 122 surrounded by a cladding portion 124. In some embodiments, the electrical wire 114 may be a copper wire for power and data transmission between the first device 140 and the second device 150. In the configuration shown in FIG. 2, the cable 110 includes one optical-fiber cable 118 in the light bar 115 for visual light display and a bundle of ten electrical wires 114 for power and data transmission between the first device 140 and the second device 150, although other configurations are possible in accordance with some embodiments of the present disclosure. In some embodiments, the first interface 121 may be a Universal Serial Bus (USB) Type-A interface, a High-Definition Multimedia Interface (HDMI) interface, or another suitable interface. In some embodiments, the second interface 131 may be a USB Type-C interface, a Micro-USB Type-A interface, a Micro-USB Type-B interface, an HDMI interface, or another suitable interface.

Figure 3:
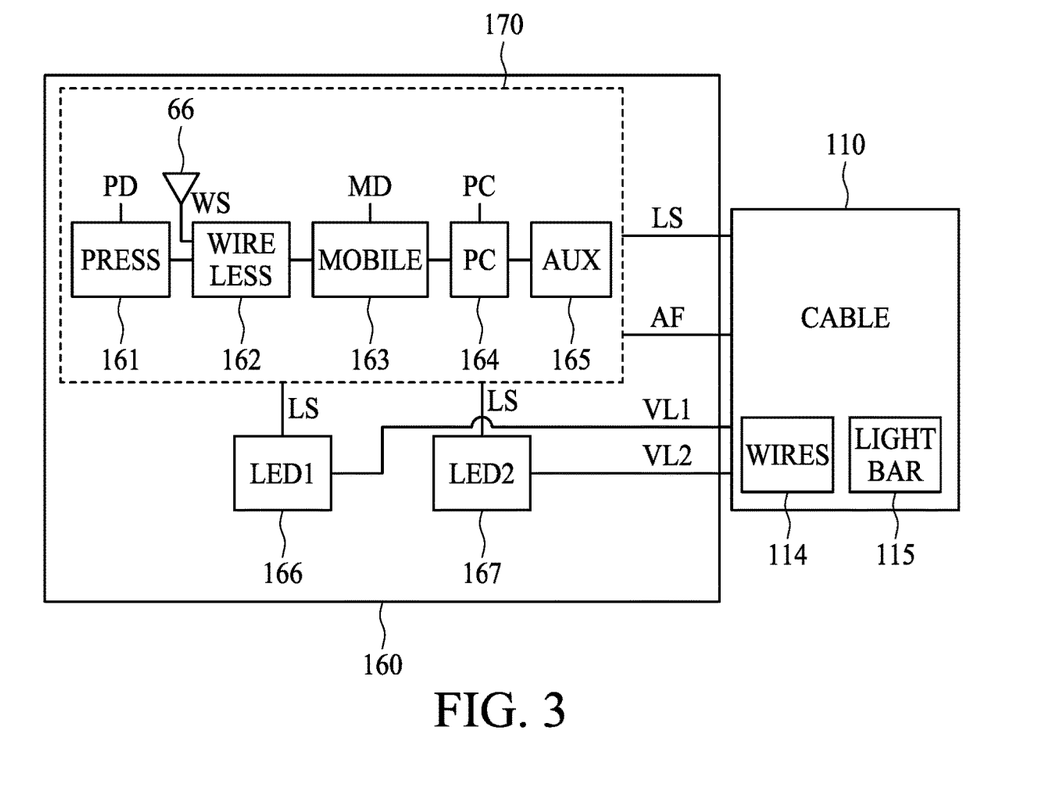
FIG. 3 is a block diagram of a cable assembly according to some embodiments of the present disclosure.

In some embodiments, the cable assembly 100 further includes at least one circuit board 160. FIG. 3 is a block diagram of the cable assembly 100 according to some embodiments of the present disclosure. It should be noted that, in some embodiments, the circuit board 160 may be disposed in the first connector 120 and the second connector 130, or in either one of the first connector 120 and the second connector 130. With reference to FIG. 3, in some embodiments, the cable assembly 100 further includes a control unit 170 configured to adjust a light setting LS of the light bar 115 in the second cavity 113. The control unit 170 is disposed in the circuit board 160. In some embodiments, the control unit 170 includes a press control subunit 161 for adjusting the light setting LS according to a press command PD, a wireless control subunit 162 for adjusting the light setting according to a wireless signal WS, a mobile device control subunit 163 for adjusting the light setting LS according to a mobile device command MD, and a personal computer control subunit 164 for adjusting the light setting LS according to a personal computer command PC. The press command PD may be generated by a user pressing a pressure sensor (not shown) on the cable assembly 100. For example, the color of the visible light produced by the light bar 115 may be changed by the user pressing the pressure sensor located on the first connector 120, the second connector 130, or on the cable 110. In some embodiments, the wireless control subunit 162 may receive the wireless signal WS from an antenna 66 coupled to the wireless control subunit 162. The wireless control subunit 162 may further include a transceiver (not shown) for sending and receiving signals via the antenna 66. The wireless signal WS may be transmitted by a mobile device such as a mobile phone, for example.

In some embodiments, the control unit 170 further includes an auxiliary function subunit 165 for controlling an auxiliary function AF of the cable assembly 100. In some embodiments, the auxiliary function AF may be a surge-protection function, and in such embodiments, the auxiliary function subunit 165 includes all the required circuitry and embedded software instructions for performing the surge-protection function. Other possibilities for the auxiliary function AF may be included according to applications of the cable assembly 100, such as a temperature-sensing capability for adjusting the light setting LS according to temperature. According to some embodiments of the present disclosure, the control unit 170 may be implemented by control integrated circuits and a memory storing program instructions (not shown), for example.

In some embodiments, with reference to FIG. 3, the circuit board 160 further includes at least one first light-emitting diode (LED) 166 for emitting a first visible light VL1 to the light bar 115. In some embodiments, the circuit board 160 may include at least one second LED 167 for emitting a second visible light VL2 to the light bar 115. In some embodiments, the first LED 166 and the second LED 167 are red, green and blue (RGB) LEDs. In some embodiments, the control unit 170 controls the first LED 166 and the second LED 167 according to the light setting LS. In some embodiments, according to the applications of the cable assembly 100, the first LED 166 and the second LED 167 may be flashed at a predetermined interval, turned on or off for a set period of time, or turned constantly on.

Figure 4A:
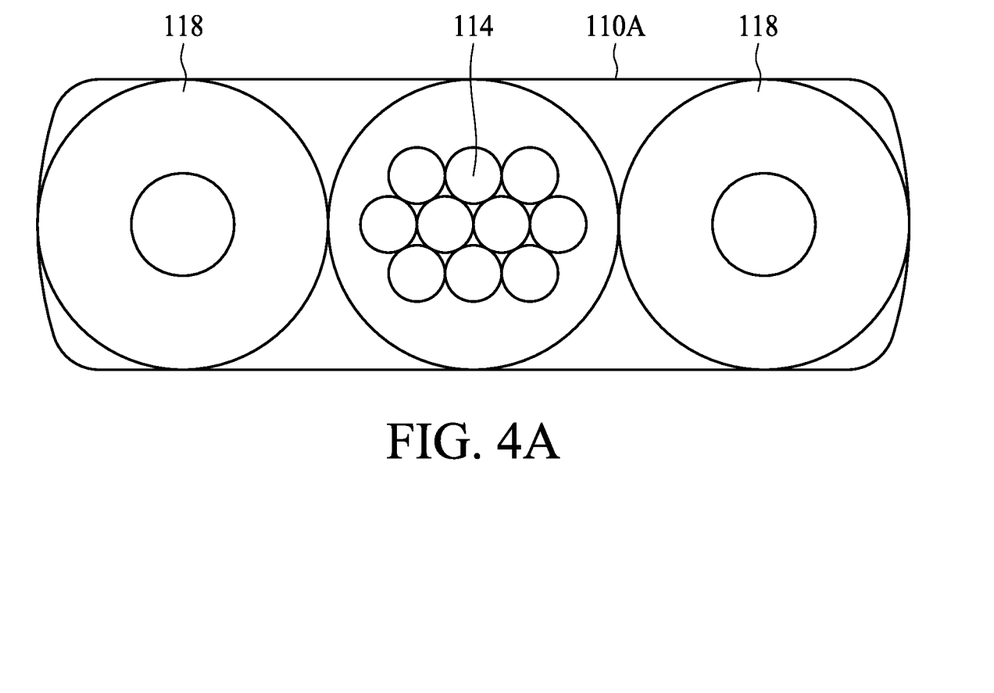
FIG. 4A is a cross-sectional view of a configuration of a cable along the line A-A' in FIG. 1 according to some embodiments of the present disclosure.
Figure 4B:
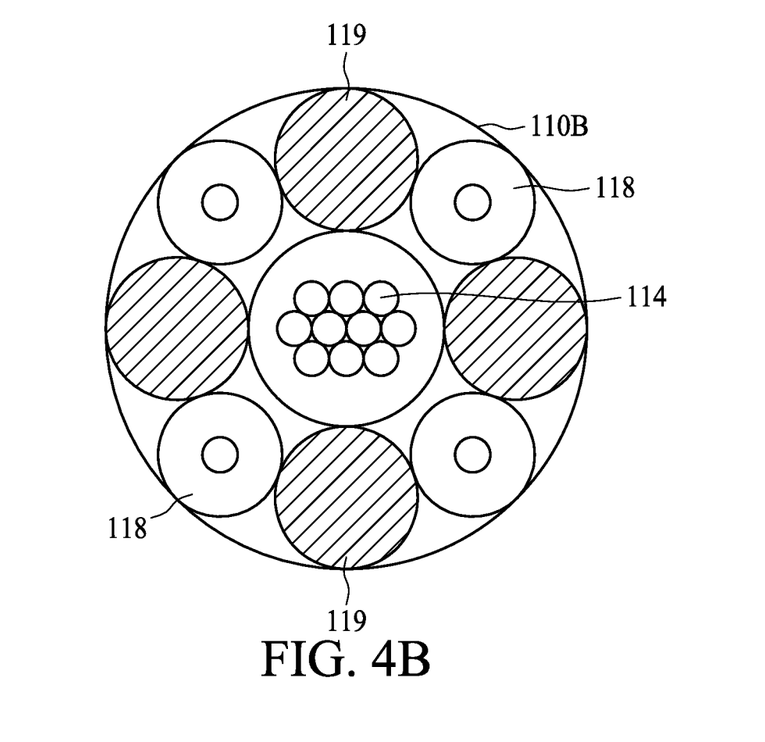
FIG. 4B is a cross-sectional view of a configuration of a cable along the line A-A' in FIG. 1 according to some embodiments of the present disclosure.

It should be noted that, in some embodiments, the cable 110 of the cable assembly 100 may be arranged in different configurations or shapes compared to those shown in the cross-sectional view of FIG. 2, depending on the applications of the cable assembly 100. The first cavity 112 and the second cavity 113 defined by the jacket 111 in FIG. 2 may be adjusted according to the different configurations or shapes. FIG. 4A and FIG. 4B are cross-sectional views of different configurations of the cable 110 along the line A-A' in FIG. 1 according to some embodiments of the present disclosure. With reference to FIG. 4A, a cable 110A in one configuration includes two optical-fiber cables 118, and ten electrical wires 114 for power and data transmission between the first device 140 and the second device 150 are sandwiched between the two optical-fiber cables 118. With reference to FIG. 4B, a cable 110B in another configuration includes four optical-fiber cables 118 surrounding a centrally-disposed bundle often electrical wires 114, along with four dummy wires 119 between the optical-fiber cables 118 that serve as strength support for the cable 110B.

As shown in FIG. 3, the control unit 170 controls the first LED 166 and the second LED 167 according to the light setting LS. In some embodiments, according to the applications of the cable assembly 100, the first LED 166 and the second LED 167 may be flashed at a predetermined interval, turned on or off for a set period of time, or turned constantly on. In some embodiments, the first LED 166 and the second LED 167 can emit visible lights VL1 and VL2 of different colors. For example, when the second interface 131 is connected to a mobile phone, the second LED 167 may emit the visible light VL2 to the light bar 115, wherein the visible light VL2 is different from the visible light VL1 emitted by the first LED 166 when the second interface 131 is connected to a different second device 150. In some embodiments, the first device 140 may be a notebook computer transmitting a data signal and a power signal to the mobile phone through the cable assembly 100.

Figure 5A:
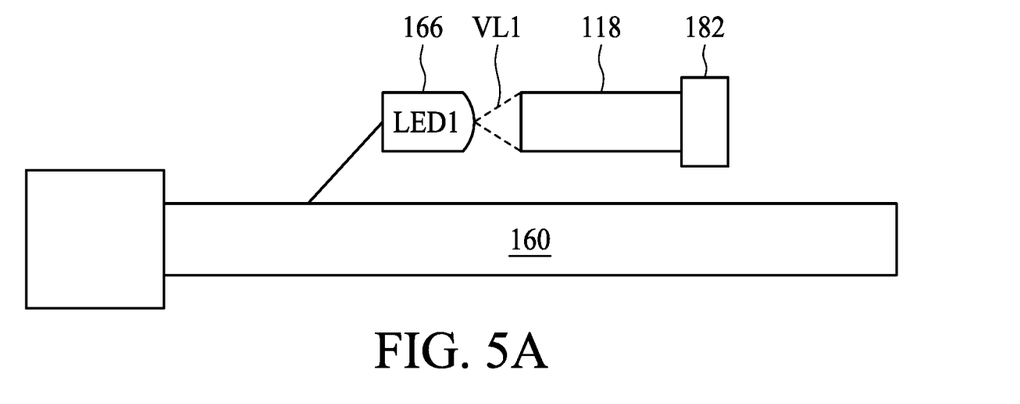
FIG. 5A is a schematic diagram depicting a light-emitting diode (LED) emitting a visible light to an optical-fiber cable according to some embodiments of the present disclosure.

FIG. 5A is a schematic diagram depicting the first LED 166 emitting the first visible light VL1 to the optical-fiber cable 118 according to some embodiments of the present disclosure. With reference to FIG. 5A, in some embodiments, the first LED 166 is disposed over the circuit board 160 and the visible light emitted by the first LED 166 is transmitted to the optical-fiber cable 118, wherein the visible light travels along the optical-fiber cable 118 by total internal reflection. In some embodiments, the optical-fiber cable 118 of the light bar 115 may be a side-emitting optical-fiber cable, for example. In some embodiments, the optical-fiber cable 118 may be integrated with a diffuser 182.

Figure 5B:
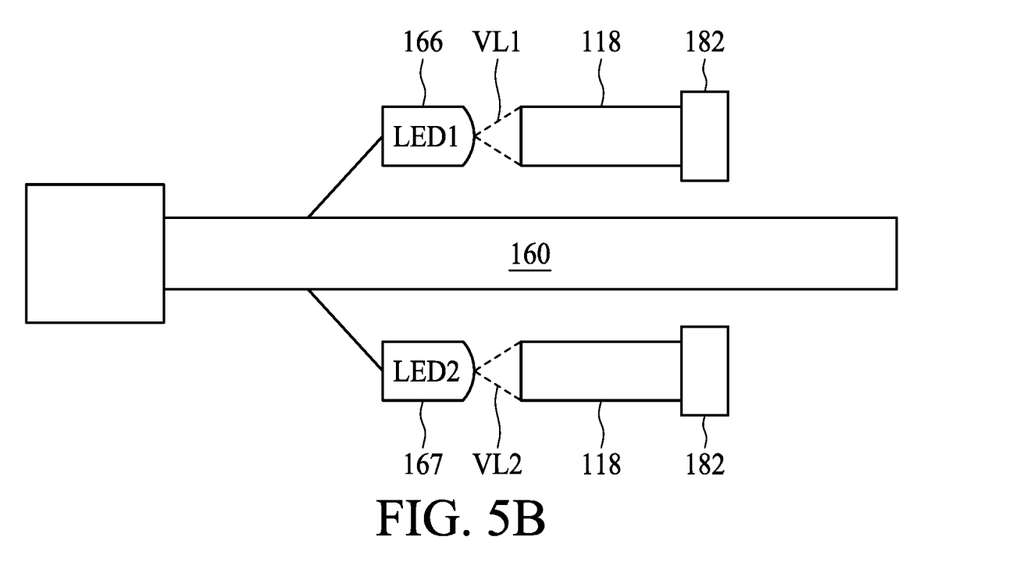
FIG. 5B is a schematic diagram depicting LEDs emitting visible light to optical-fiber cables according to some embodiments of the present disclosure.

FIG. 5B is a schematic diagram depicting the first LED 166 and the second LED 167 each emitting a visible light to the optical-fiber cables 118 according to some embodiments of the present disclosure. With reference to FIG. 5B, in some embodiments, the first LED 166 is disposed over the circuit board 160, and the second LED 167 is disposed under the circuit board 160. Each of visible light VL1 and visible light VL2, respectively emitted by the first LED 166 and the second LED 167, is transmitted to a corresponding optical-fiber cable 118, where the visible light VL1 and visible light VL2 travel along the corresponding optical-fiber cable 118 by total internal reflection. In some embodiments, the optical-fiber cables 118 of the light bar 115 may be side-emitting optical-fiber cables, for example. In some embodiments, each optical-fiber cable 118 may be integrated with a corresponding diffuser 182.

Figure 6:
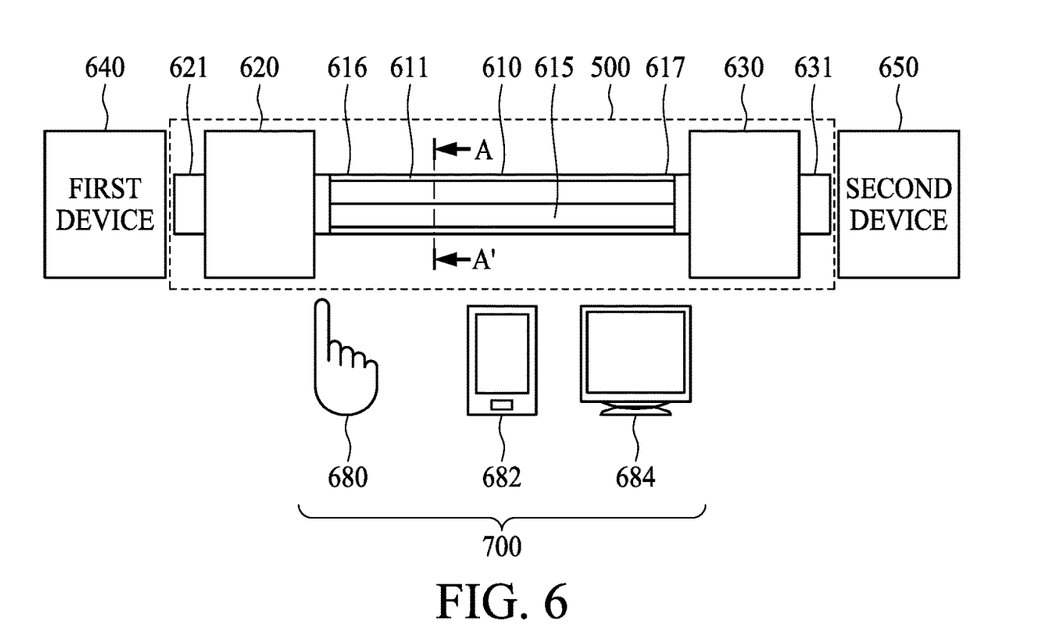
FIG. 6 is a top view of a cable indication system according to some embodiments of the present disclosure.
Figure 7:
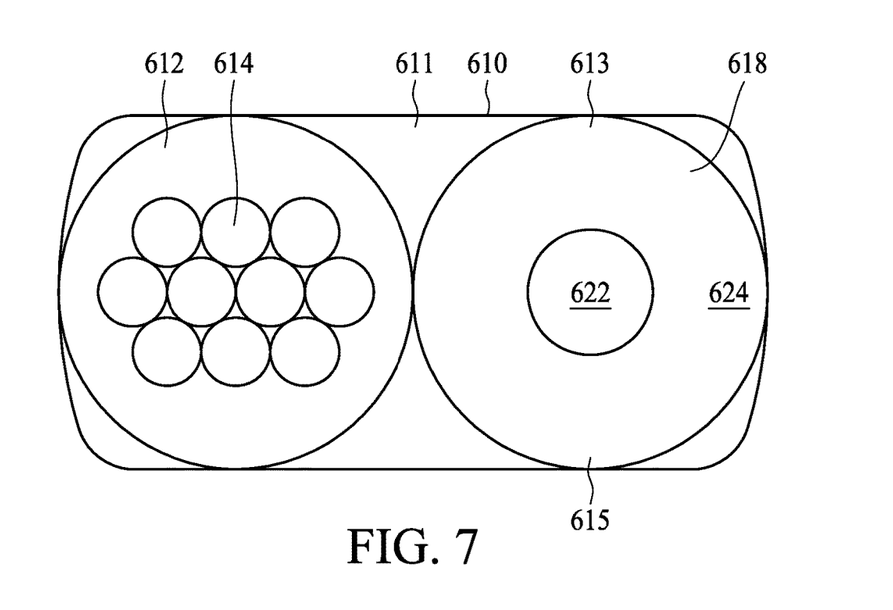
FIG. 7 is a cross-sectional view of a cable in a cable assembly along the line A-A' in FIG. 6 according to some embodiments of the present disclosure.

According to some embodiments of the present disclosure, a cable indication system in which a user can adjust a light setting remotely or by hand is provided. Since the user is able to change the color of light for different cables, the user can visually differentiate between different cables and their connected devices, thereby increasing convenience and the aesthetics of the cables. FIG. 6 is a top view of a cable indication system 600 according to some embodiments of the present disclosure. FIG. 7 is a cross-sectional view along the line A-A' in FIG. 6 of a cable 610 in a cable assembly 500 according to some embodiments of the present disclosure. With reference to FIG. 6 and FIG. 7, in some embodiments, the cable indication system 600 includes the cable assembly 500 and a setting controller 700. The cable assembly 500 includes a cable 610, a first connector 620, and a second connector 630. As shown in FIG. 7, the cable 610 includes a jacket 611 defining a first cavity 612 and a second cavity 613. The first cavity 612 includes at least one electrical wire 614 extending through the first cavity 612. The second cavity 613 includes a light bar 615 extending through the second cavity 613. The first connector 620 is electrically coupled to a first end 616 of the cable 610, and the first connector 620 includes a first interface 621 for connecting with a first device 640. The second connector 630 is electrically coupled to a second end 617 of the cable 610, and the second connector 630 includes a second interface 631 for connecting with a second device 650. In some embodiments, the light bar 615 includes at least one optical-fiber cable 618 having a core portion 622 surrounded by a cladding portion 624. In some embodiments, the electrical wire 614 may be a copper wire for power and data transmission between the first device 640 and the second device 650. In the configuration shown in FIG. 7, the cable 610 includes one optical-fiber cable 618 in the light bar 615 for visual light display and a bundle often electrical wires 614 for power and data transmission between the first device 640 and the second device 650, although other configurations are possible in accordance with some embodiments of the present disclosure. In some embodiments, the first interface 621 may be a USB Type-A interface, an HDMI interface, or another suitable interface. In some embodiments, the second interface 631 may be a USB Type-C interface, a Micro-USB Type-A interface, a Micro-USB Type-B interface, an HDMI interface, or another suitable interface. As shown in FIG. 6, the cable indication system 600 further includes a setting controller 700 represented by a user's hand 680, a mobile device 682, and a personal computer 684. In some embodiments, the setting controller 700 transmits a command to adjust the light setting LS of the light bar 615, which will be discussed in detail later in the present disclosure. However, it should be noted that other devices may be used as the setting controller 700, and embodiments of the present disclosure are not limited by the devices shown in FIG. 6.

Figure 8:
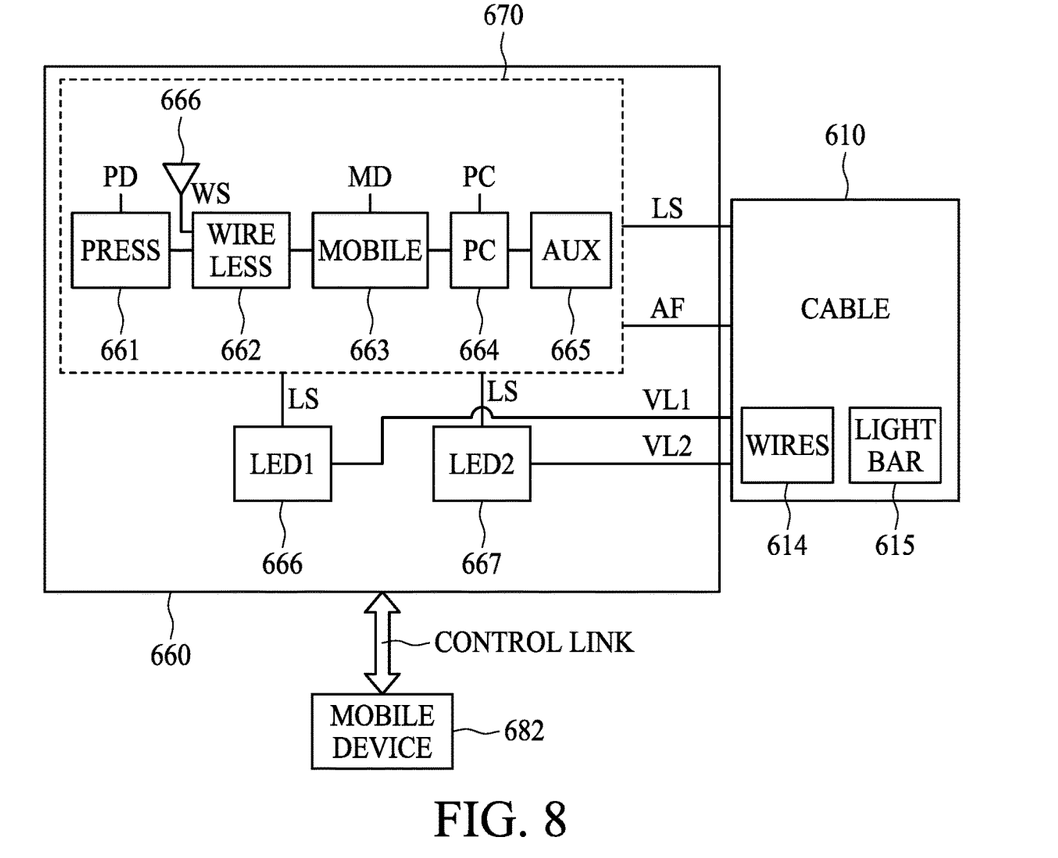
FIG. 8 is a block diagram of a cable indication system according to some embodiments of the disclosure.

In some embodiments, the cable assembly 500 of the cable indication system 600 further includes at least one circuit board 660. FIG. 8 is a block diagram of the cable indication system 600 according to some embodiments of the disclosure. It should be noted that, in some embodiments, the circuit board 660 may be disposed in the first connector 620 and the second connector 630, or in either one of the first connector 620 and the second connector 630. With reference to FIG. 8, in some embodiments, the cable assembly 500 further includes a control unit 670 configured to adjust the light setting LS of the light bar 615 in the second cavity 613. The control unit 670 is disposed in the circuit board 660. In some embodiments, the control unit 670 includes a press control subunit 661 for adjusting the light setting LS according to the press command PD, a wireless control subunit 662 for adjusting the light setting according to the wireless signal WS, a mobile device control unit 663 for adjusting the light setting LS according to the mobile device command MD, and a personal computer control subunit 664 for adjusting the light setting LS according to the personal computer command PC. The press command PD may be generated by the user's hand 680 pressing a pressure sensor (not shown) on the cable assembly 500. For example, the color of the visible light produced by the light bar 615 may be changed by the user's hand 680 pressing the pressure sensor located on the first connector 620, the second connector 630, or on the cable 610. In some embodiments, the wireless control subunit 662 may receive the wireless signal WS from an antenna 666 coupled to the wireless control subunit 662. The wireless control subunit 662 may further include a transceiver (not shown) for sending and receiving signals via the antenna 666. The wireless signal WS may be transmitted by the mobile device 682, which may be a mobile phone or a tablet computer, for example. In some embodiments, the user may select a desired adjustment to the light setting LS, such as a change of color or duration of display, from an application on the mobile device 682. The personal computer command PC may be transmitted by the personal computer 684, for example. It should be noted that the block diagram of FIG. 8 uses the mobile device 682 as the setting controller 700 merely as an illustrative example, and other devices can also be used.

In some embodiments, the control unit 670 further includes an auxiliary function subunit 665 for controlling an auxiliary function AF of the cable assembly 500. In some embodiments, the auxiliary function AF may be a surge-protection function for protection in the event of a power surge, and in such embodiments, the auxiliary function subunit 665 includes all the required circuitry (i.e., filters) and embedded software instructions for performing the surge-protection function. Other possibilities for the auxiliary function AF may be included in accordance with applications of the cable assembly 500, such as a temperature-sensing capability for adjusting the light setting LS according to temperature. According to some embodiments of the present disclosure, the control unit 670 may be implemented by control integrated circuits and a memory storing program instructions (not shown), for example.

In some embodiments, with reference to FIG. 8, the circuit board 660 further includes at least one first light-emitting diode (LED) 666 for emitting the first visible light VL1 to the light bar 615. In some embodiments, the circuit board 660 may include at least one second LED 667 for emitting a second visible light VL2 to the light bar 615. In some embodiments, the first LED 666 and the second LED 667 are red, green and blue (RGB) LEDs. In some embodiments, the control unit 670 controls the first LED 666 and the second LED 667 according to the light setting LS. In some embodiments, according to the applications of the cable assembly 500, the first LED 666 and the second LED 667 may be flashed at a predetermined interval, turned on or off for a set period of time, or turned constantly on.

Figure 9A:
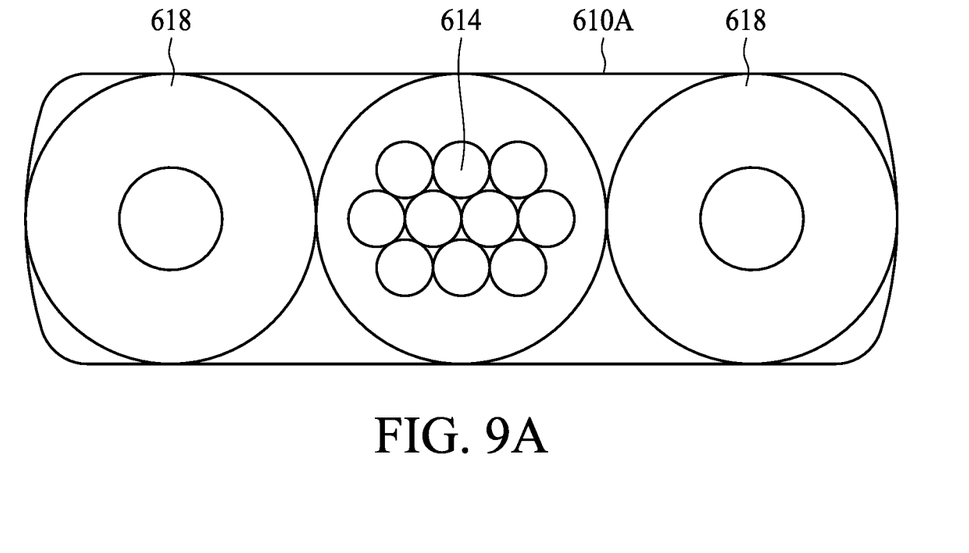
FIG. 9A is a cross-sectional view of a configuration of a cable along the line A-A' in FIG. 6 according to some embodiments of the present disclosure.
Figure 9B:
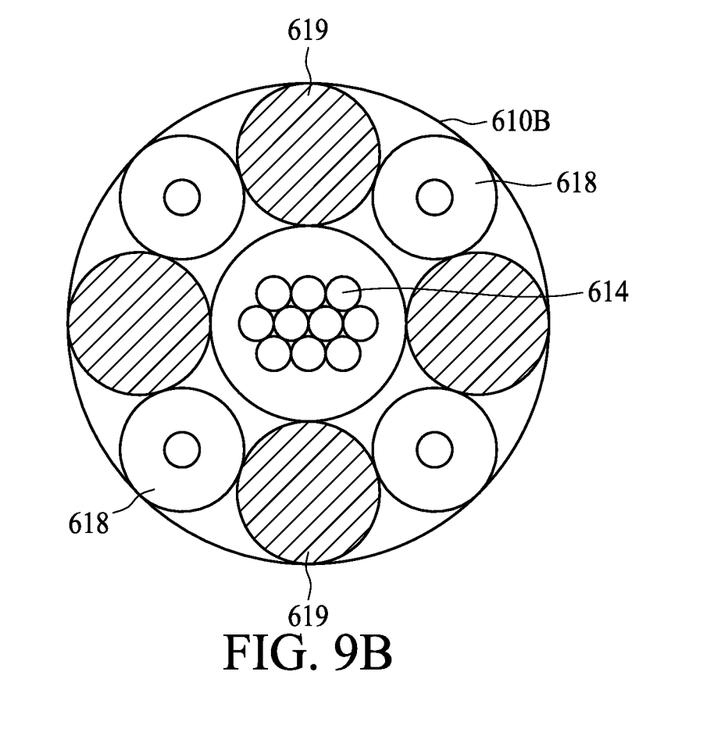
FIG. 9B is a cross-sectional view of a configuration of a cable along the line A-A' in FIG. 6 according to some embodiments of the present disclosure.

It should be noted that, in some embodiments, the cable 610 of the cable assembly 500 may be arranged in different configurations or shapes compared to those shown in the cross-sectional view of FIG. 7 depending on the applications of the cable assembly 500. The first cavity 612 and the second cavity 613 defined by the jacket 611 in FIG. 7 may be adjusted according to the different configurations or shapes. FIG. 9A and FIG. 9B are cross-sectional views of different configurations of the cable 610 along the line A-A' in FIG. 6 according to some embodiments of the present disclosure. With reference to FIG. 9A, a cable 610A in one configuration includes two optical-fiber cables 618, and ten electrical wires 614 for power and data transmission between the first device 640 and the second device 650 are sandwiched between the two optical-fiber cables 618. With reference to FIG. 9B, a cable 610B in another configuration includes four optical-fiber cables 618 surrounding a centrally-disposed bundle often electrical wires 614, along with four dummy wires 619 between the optical-fiber cables 118 that serve as strength support for the cable 610B.

As shown in FIG. 8, the control unit 670 controls the first LED 666 and the second LED 667 according to the light setting LS. In some embodiments, according to the applications of the cable assembly 500, the first LED 666 and the second LED 667 may be flashed at a predetermined interval, turned on or off for a set period of time, or turned constantly on. In some embodiments, the first LED 666 and the second LED 667 can emit visible light of different colors. For example, when the second interface 631 is connected to a mobile phone, for example, the second LED 667 may emit the visible light VL2 to the light bar 615, wherein the visible light VL2 is different from the visible light VL1 emitted by the first LED 666 when the second interface 631 is connected to a different second device 650. In some embodiments, the first device 640 may be a power and data source, and the second device 650 may be an external device receiving power and data from the first device 640. For example, the first device 640 may be a notebook computer, and the second device 660 may be the mobile phone, wherein the notebook computer transmits a data signal and a power signal to the mobile phone through the cable assembly 500.

Figure 10A:
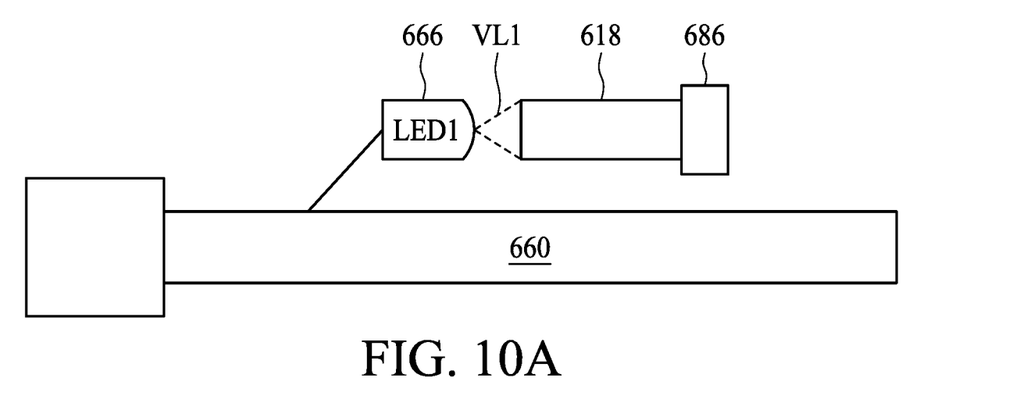
FIG. 10A is a schematic diagram depicting an LED emitting a visible light to an optical-fiber cable according to some embodiments of the present disclosure.

FIG. 10A is a schematic diagram depicting the first LED 666 emitting the first visible light VL1 to the optical-fiber cable 618 according to some embodiments of the present disclosure. With reference to FIG. 10A, in some embodiments, the first LED 666 is disposed over the circuit board 660 and the visible light emitted by the first LED 666 is transmitted to the optical-fiber cable 618, where the visible light travels along the optical-fiber cable 618 by total internal reflection. In some embodiments, the optical-fiber cable 618 of the light bar 615 may be a side-emitting optical-fiber cable, for example. In some embodiments, the optical-fiber cable 618 may be integrated with a diffuser 686.

Figure 10B:
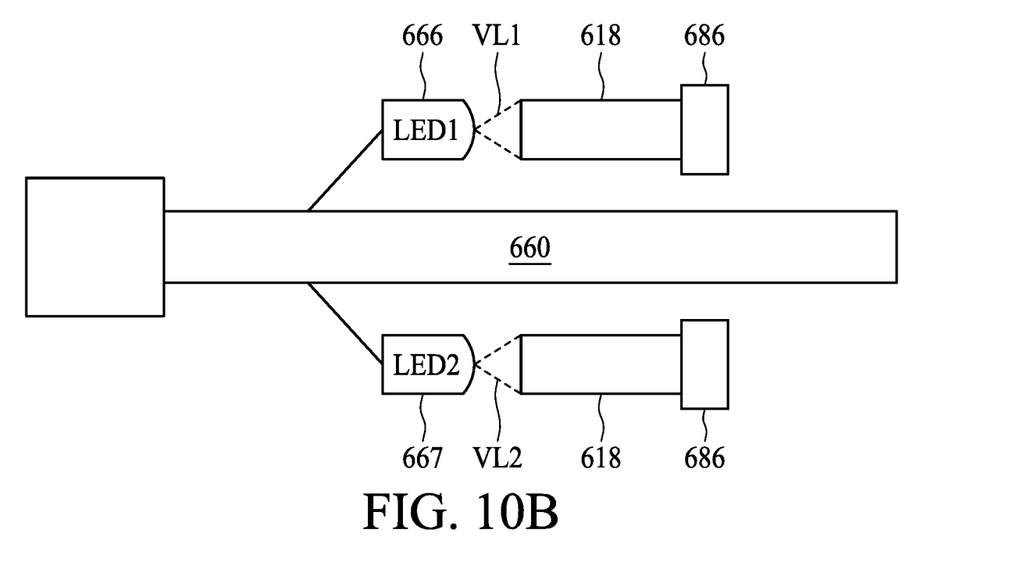
FIG. 10B is a schematic diagram depicting LEDs emitting visible light to optical-fiber cables according to some embodiments of the present disclosure.

FIG. 10B is a schematic diagram depicting the first LED 666 and the second LED 667 each emitting a visible light to the optical-fiber cables 618 according to some embodiments of the present disclosure. With reference to FIG. 10B, in some embodiments, the first LED 666 is disposed over the circuit board 660, and the second LED 667 is disposed under the circuit board 660. Each of visible light VL1 and visible light VL2, respectively emitted by the first LED 666 and the second LED 667, is transmitted to a corresponding optical-fiber cable 618, and travels along the corresponding optical-fiber cable 618 by total internal reflection. In some embodiments, the optical-fiber cables 618 of the light bar 615 may be side-emitting optical-fiber cables, for example. In some embodiments, each optical-fiber cable 618 may be integrated with a corresponding diffuser 686.

Accordingly, the cable assembly 500 and the cable indication system enable the user to adjust the light setting LS remotely, such as by an application on the mobile phone, or by hand. Since the user is able to change the color of light for different cables 610, the user can visually differentiate between different cables and their connected devices, thereby increasing convenience and the aesthetics of the cables.

One aspect of the present disclosure provides a cable assembly, including a cable, a first connector, and a second connector. The cable includes a jacket defining a first cavity and a second cavity, the first cavity includes at least one electrical wire extending through the first cavity, and the second cavity includes a light bar extending through the second cavity. The first connector is electrically coupled to a first end of the cable, and the first connector includes a first interface for connecting with a first device. The second connector is electrically coupled to a second end of the cable, and the second connector includes a second interface for connecting with a second device.

Another aspect of the present disclosure provides a cable indication system, including a cable assembly and a setting controller. The cable assembly includes a cable, a first connector, a second connector, and a control unit. The cable includes a jacket defining a first cavity and a second cavity, the first cavity includes at least one electrical wire extending through the first cavity, and the second cavity includes a light bar extending through the second cavity. The first connector is electrically coupled to a first end of the cable, and includes a first interface for connecting with a first device. The second connector is electrically coupled to a second end of the cable, and includes a second interface for connecting with a second device. The control unit is configured to adjust a light setting of the light bar in the second cavity. The setting controller transmits a command to adjust the light setting of the light bar.

Although the present disclosure and its advantages have been described in detail, it should be understood that various changes, substitutions and alterations can be made herein without departing from the spirit and scope of the disclosure as defined by the appended claims. For example, many of the processes discussed above can be implemented in different methodologies and replaced by other processes, or a combination thereof.

Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, and steps.

What is claimed is:
1. A cable assembly, comprising:
   a cable comprising a jacket defining a first cavity and a second cavity, wherein the first cavity comprises at least one electrical wire extending through the first cavity, and the second cavity comprises a light bar extending through the second cavity;
   a first connector electrically coupled to a first end of the cable, wherein the first connector comprises a first interface for connecting with a first device;

a second connector electrically coupled to a second end of the cable, wherein the second connector comprises a second interface for connecting with a second device; and a control unit configured to adjust a light setting of the light bar in the second cavity.

2. The cable assembly of claim 1, wherein the light bar comprises at least one optical-fiber cable having a core portion surrounded by a cladding portion in the second cavity.

3. The cable assembly of claim 1, wherein the at least one electrical wire is a copper wire for power and signal transmission between the first device and the second device.

4. The cable assembly of claim 1, wherein the control unit comprises:
 a press control subunit for adjusting the light setting according to a press command;
 a wireless control subunit for adjusting the light setting according to a wireless signal;
 a mobile device control subunit for adjusting the light setting according to a mobile device command; and
 a personal computer control subunit for adjusting the light setting according to a personal computer command.

5. The cable assembly of claim 1, wherein the control unit further comprises:
 an auxiliary function subunit for controlling an auxiliary function of the cable assembly.

6. The cable assembly of claim 1, further comprising at least one circuit board, wherein the control unit is disposed in the circuit board, the circuit board further comprising at least one first light-emitting diode (LED) for emitting a first visible light to the light bar.

7. The cable assembly of claim 6, wherein the circuit board further comprises at least one second LED for emitting a second visible light to the light bar.

8. The cable assembly of claim 7, wherein the first LED and the second LED are red, green and blue (RGB) LEDs.

9. The cable assembly of claim 8, wherein the control unit controls the first LED and the second LED according to the light setting, wherein the first LED and the second LED are flashed at a predetermined interval, turned on or off for a set period of time, or turned constantly on.

10. A cable indication system, comprising:
 a cable assembly, comprising:
  a cable comprising a jacket defining a first cavity and a second cavity, wherein the first cavity comprises at least one electrical wire extending through the first cavity, and the second cavity comprises a light bar extending through the second cavity;
  a first connector electrically coupled to a first end of the cable, wherein the first connector comprises a first interface for connecting with a first device;
  a second connector electrically coupled to a second end of the cable, wherein the second connector comprises a second interface for connecting with a second device; and
  a control unit configured to adjust a light setting of the light bar in the second cavity; and
 a setting controller for transmitting a command to adjust the light setting of the light bar.

11. The cable indication system of claim 10, wherein the light bar comprises at least one optical-fiber cable having a core portion surrounded by a cladding portion in the second cavity.

12. The cable indication system of claim 10, wherein the at least one electrical wire is a copper wire for power and signal transmission between the first device and the second device.

13. The cable indication system of claim 10, wherein the control unit comprises:
 a press control subunit for adjusting the light setting according to a press command;
 a wireless control subunit for adjusting the light setting according to a wireless signal;
 a handset control subunit for adjusting the light setting according to a handset command; and
 a personal computer control subunit for adjusting the light setting according to a personal computer command.

14. The cable indication system of claim 10, wherein the control unit further comprises:
 an auxiliary function subunit for controlling an auxiliary function of the cable assembly.

15. The cable indication system of claim 10, further comprising at least one circuit board, wherein the control unit is disposed in the circuit board, the circuit board further comprising at least one first LED for emitting a first visible light to the light bar.

16. The cable indication system of claim 10, wherein the circuit board further comprises at least one second LED for emitting a second visible light to the light bar.

17. The cable indication system of claim 16, wherein the first LED and the second LED are RGB LEDs.

18. The cable indication system of claim 17, wherein the control unit controls the first LED and the second LED according to the light setting, wherein the first LED and the second LED are flashed at a predetermined interval, turned on or off for a set period of time, or turned constantly on.

19. The cable indication system of claim 10, wherein the first device is a power and data source, and the second device is an external device receiving power and data from the first device.

* * * * *